United States Patent

[11] 3,548,975

| [72] | Inventor | Robert R. Herndon<br>207 Short Mountain St., Smithville, Tenn. 37166 |
|---|---|---|
| [21] | Appl. No. | 800,144 |
| [22] | Filed | Feb. 18, 1969 |
| [45] | Patented | Dec. 22, 1970 |

[54] TANDEM WHEEL LOCK
3 Claims, 2 Drawing Figs.

| [52] | U.S. Cl. | 188/74 |
|---|---|---|
| [51] | Int. Cl. | F16d 63/00 |
| [50] | Field of Search | 188/52, 53, 54, 55, 2, 74; 192/79 |

[56] References Cited
UNITED STATES PATENTS

| 255,431 | 3/1882 | Kelly | 188/52 |
|---|---|---|---|
| 433,413 | 7/1890 | Lawrence | 188/54 |
| 2,239,592 | 4/1941 | Conner | 188/52X |

*Primary Examiner*—George E. A. Halvosa
*Attorney*—Harrington A. Lackey

ABSTRACT: A wheel lock for the tandem wheels of a vehicle including upper and lower shoes, link members connecting the shoes for movement toward and away from each other and an actuator member operatively connected to the link members for drawing the shoes together to engage the opposed tandem wheel surfaces.

PATENTED DEC 22 1970

INVENTOR
ROBERT R. HERNDON
BY
Harrington A. Lockey
ATTORNEY

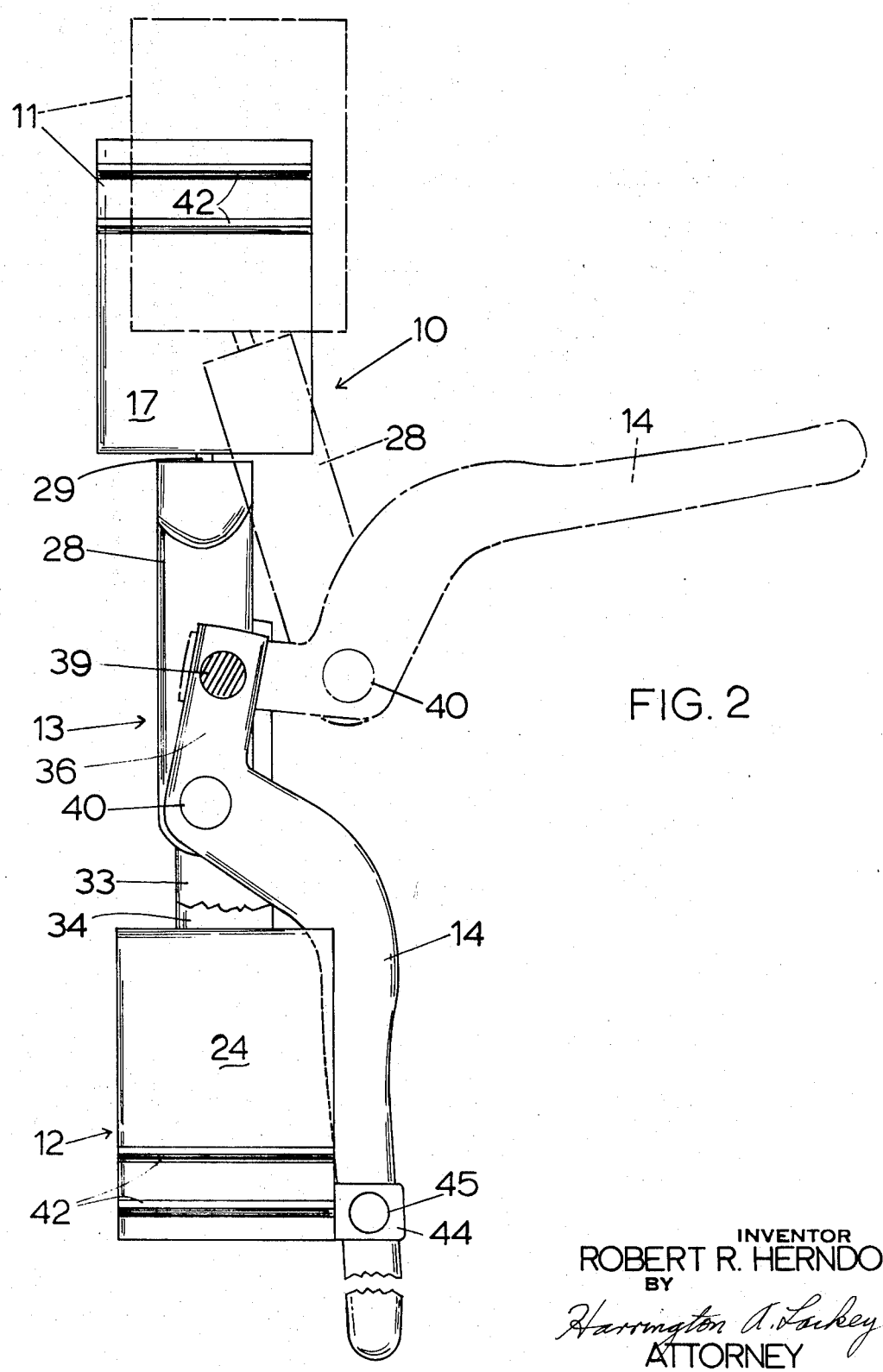

TANDEM WHEEL LOCK

BACKGROUND OF THE INVENTION

This invention relates to a wheel lock, and more particularly to a lock for the tandem wheels of a parked vehicle.

The conventional method of anchoring wheeled vehicles, which have no braking system of their own, such as trailers or campers, is to level and block the wheels in stationary position with whatever materials are available, usually logs, lumber, or stones. The degree of stability of the parked-wheeled vehicle depends upon the reliability, strength and shape of the blocking and leveling materials available.

Although U.S. Pat. No. 3,059,728, issued to McKuskie on Oct. 23, 1962, discloses a wheel lock for the tandem wheels of a vehicle, nevertheless, the McKuskie patent specifies that the lock was designed for large and heavy vehicles, such as jet aircraft, and would not be suitable for the closely spaced tandem wheels of small campers or trailers.

SUMMARY OF THE INVENTION

The wheel lock made in accordance with this invention includes an upper shoe having downwardly converging opposed surfaces, and a lower shoe having upwardly converging opposed surfaces, both shoes being adapted to fit between a pair of closely spaced, preferably tired, tandem wheels of a small camper or trailer. The running length of each shoe is slightly greater than the minimum distance between the tires so that when the shoes are moved toward each other, they will be forced into frictional engagement with the opposed surfaces of the upper and lower portions of the tires. The lock further includes link members connecting the shoes for movement toward and away from each other, and an actuator handle connected to the link members to operate the link members.

BRIEF DESCRIPTION OF THE DRAWINGS

FIG. 2. is a section taken along the line 2—2 of FIG. 1, with the device disclosed in phantom in inoperative position.

DESCRIPTION OF THE PREFERRED EMBODIMENT

Figure 1:
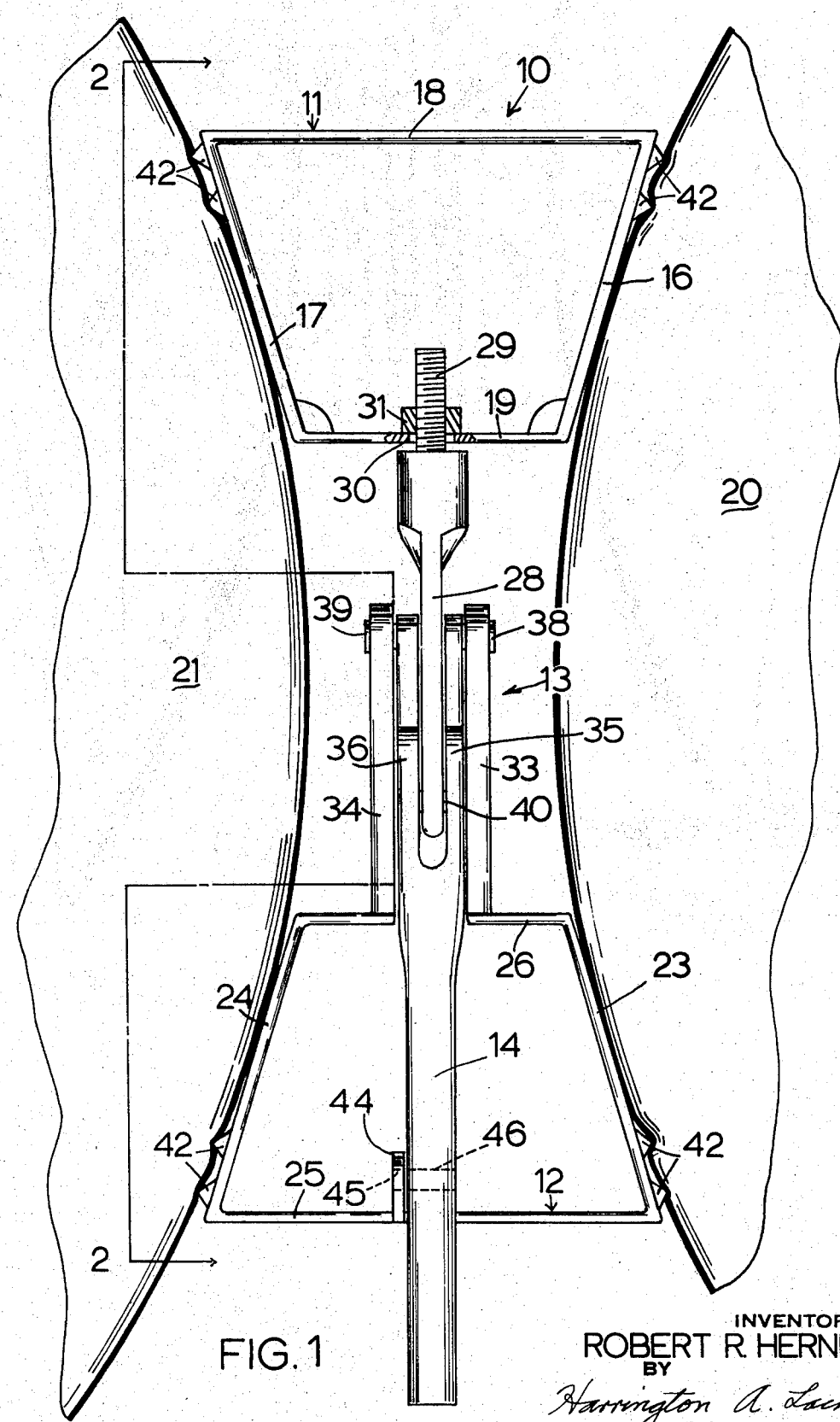
FIG. 1. is a side elevation of the invention disposed in locked, operative position between a pair of tandem wheels, shown fragmentarily.

Referring now to the drawings in more detail, the wheel lock 10 made in accordance with this invention comprises an upper shoe 11, a lower shoe 12, a link mechanism 13, and an actuator handle or lever 14.

The upper shoe 11 is wedged-shaped, having a front wall 16 and a rear wall 17 converging downward from a top wall 18 to a bottom wall 19. The upper shoe 11 is adapted to be placed between the upper opposed surfaces of a pair of tandem wheels, such as the tired wheels 20 and 21 of a vehicle, such as a camping trailer. The maximum length of the upper shoe 11, which would be the length of the top wall 18, is greater than the minimum distance between the wheels 20 and 21, so that the upper shoe 11 may fit between the wheels 20 and 21 in a space above the longitudinal center line extending through the wheel hubs or centers. Thus, when the upper shoe 11 is fitted in position between the wheels 20 and 21, the front wall 16 will fit in frictional engagement against the rear upper surface of the front wheel 20, while the rear wall 17 will fit in frictional engagement against the front upper surface of the rear wheel 21.

In a similar manner, the lower shoe 12 preferably is of identical size and shape to the upper shoe 11, except that the lower shoe 12 is upside down. The lower shoe 12 also has a front converging wall 23, a rear-converging wall 24, a bottom wall 25, and a top wall 26. The lower shoe 12 is also adapted to be disposed in the same relative position between the lower opposed surfaces of the same tandem wheels 20 and 21 below the hub center line as the upper shoe 11 is disposed above the centerline. When the lower shoe 12 is moved upward, the front wall 23 will engage the lower rear surface of the front tandem wheel 20, while the rear wall 24 will engage the lower front surface of the rear tandem wheel 21.

Depending from the upper shoe 11 is an upper link arm 28. In order that the upper link arm 28 may be vertically adjusted relative to the upper shoe 11, the upper end of the link arm 28 forms an upwardly projecting threaded stud 29, which extends through a slightly enlarged opening 30 in the bottom wall 19 of the upper shoe 11. The stud 29 is threadedly engaged by a nut 31, the cross-sectional dimensions of which are larger than the diameter of the opening 30. By turning the nut 31 upon the threaded stud 29, the upper link arm 28 may be vertically adjusted relative to the upper shoe 11.

Rigidly fixed to the top wall 26 of the lower shoe 12 and projecting upwardly therefrom are a pair of spaced parallel lower link arms 33 and 34.

The inner end of the actuator handle 14 is angular shaped and forked to provide a pair of parallel end members 35 and 36 spaced-apart enough to receive the depending upper link arm 28, yet spaced close enough to be received between the spaced-apart lower link arms 33 and 34. The upper or inner ends of the forked end members 35 and 36 are secured to the upper ends of the lower link arms 33 and 34 by pins 38 and 39 for relative pivotal movement of the handle 14 and the lower link arms 33 and 34 about a pivotal axis parallel to the running length of a vehicle, or to the hub center line The lower end of the upper link arm 28 is secured to an intermediate portion of the actuator handle 14 and between the forked end members 35 and 36 by a pin 40 to permit pivotal movement of the upper link arm 28 with the actuator handle 14 about an axis parallel to the running length of the vehicle, or the hub center line of the vehicle wheels 20 and 21.

I If desired, the front and rear tapered walls 16, 17, 23 and 24 of the respective upper and lower shoes 11 and 12 may be provided with cleats 42 to provide better frictional engagement between the shoes 11 and 12 and the respective upper and lower surfaces of the wheels 20 and 21.

If desired, a locking tang 44 having a hole 45 may be fixed to the lower wall 25 of the lower shoe 12 for alignment with a mating hole 46 in the actuator handle 14, when the handle 14 is in locked operative position, as disclosed in FIGS. 1 and 2, for receiving the hasp of a padlock, not shown. In this manner, the wheel lock 10 may be locked in operative position to discourage tampering or unauthorized removal of lock 10.

The operation of the wheel lock 10 is effected by first placing the lock 10 in its expanded inoperative position by rotating the actuator handle 14 outward to outboard position such as that disclosed in phantom in FIG. 2. The lower shoe 12 is placed between the lower opposed surfaces of the wheels 20 and 21 in a position slightly lower than that disclosed in FIG. 1. The lower shoe 12 is then manually pushed upwardly until the front and rear walls 23 and 24 engage their corresponding wheel surfaces.

The upper shoe 11 is then moved inboard in a manner suggested by the dashed line position of the upper shoe 11 and upper link arm 28 disclosed in phantom in FIG. 2. In moving the upper shoe 11 inboard, it will be noted that the opening 30 is large enough to permit a loose coupling between the upper shoe 11 and the upper link arm 28 so that as the upper link arm 28 pivots about the pivot pin 40, the upper shoe 11 may retain its upright attitude as disclosed in the phantom position of FIG. 2. After the upper shoe 11 is substantially vertically aligned with the lower shoe 12, the actuator handle 14 is then depressed, gradually forcing the upper shoe 11 downwardly into engagement with the opposed surfaces of the wheels 20 and 21.

When the actuator handle 14 has reached its solid-line position in FIGS. 1 and 2, the upper shoe 11 and the lower shoe 12 have not only engaged the corresponding opposed surfaces of the wheels 20 and 21, but have actually forced the walls 16 and 17 downward and the walls 23 and 24 upward into the tired wheels, so that the portions of the opposed wheel surfaces adjacent the link mechanism 13 are actually squeezed between the upper shoe 11 and the lower shoe 12. In this manner, there is not only a tight frictional engagement between the front and rear walls of both the upper and lower shoes 11 and 12, but also depressions formed in the circumferential extent of the tired wheels 20 and 21 to further prevent slipping of the wheel surfaces against the corresponding walls of the wheel lock shoes 11 and 12. Thus, this double-locking or braking function of the wheel lock 10 is so effective it has actually held tandem wheels, such as 20 and 21, in a stationary position even when the vehicle is parked on a slope.

As previously mentioned, after the actuator handle 14 has been depressed to the operative locked position, the handle 14 may be secured in place by extending the hasp of a padlock through the mating openings 45 and 46 and clasping the padlock, until removed by the key of the authorized operator.

The locking effect upon the tired wheels 20 and 21 may be varied by rotating the nut 31 upon the threaded stud 29 in order to properly adjust the vertical spacing between the upper shoe 11 and the lower shoe 12. Such an adjustment will also be necessary for tired wheels 20 and 21 of different sizes or different spacing.

I claim:
1. A wheel lock for a parked vehicle having a pair of proximately spaced tandem wheels, comprising:
   a. an upper shoe having front and rear faces converging downward and adapted to frictionally engage the upper opposed surfaces of said tandem wheels;
   b. a lower shoe having front and rear faces converging upward and adapted to frictionally engage the lower opposed surfaces of said tandem wheels;
   c. an upper link arm connected to and depending from said upper shoe;
   d. a lower link arm connected to and projecting upward from said lower shoe;
   e. an actuator lever having an inner end portion, an outer end portion, and an intermediate portion spaced between said inner and outer end portions;
   f. first means connecting said inner end portion to one of said arms for relative pivotal movement about a first axis extending front-to-rear, to permit said lever to swing in an inboard-outboard direction relative to said shoes;
   g. second means connecting said intermediate portion to the other of said arms for relative pivotal movement about a second axis parallel to said first axis, so that said lever is adapted to swing between an outboard projecting, wheel unlocking position, in which said shoes are moved away from each other, and a wheel-locking position inboard of said unlocking position, in which said shoes are moved toward each other.

2. The invention according to claim 1 further comprising loose coupling means connecting said upper arm to said upper shoe to permit said upper arm to swing outboard of said upper shoe during the pivotal movement of said lever.

3. The invention according to claim 1 further comprising means on said lever and on said lower shoe for securing said lever to said lower shoe when said lever is in said wheel-locking position.